United States Patent
Malling et al.

(10) Patent No.: US 10,197,690 B2
(45) Date of Patent: Feb. 5, 2019

(54) METHOD FOR ACQUIRING GEOPHYSICAL DATA BY DYNAMICALLY MANIPULATING SURVEY SPREAD

(71) Applicant: PGS Geophysical AS, Lilleaker, Oslo (NO)

(72) Inventors: Michael Malling, Oslo (NO); Toralf Lund, Oslo (NO); Tom Vincent-Dospital, West-Sussex (GB); Tollef Jahren, Oslo (NO)

(73) Assignee: PGS Geophysical AS, Oslo (NO)

( * ) Notice: Subject to any disclaimer, the term of this patent is extended or adjusted under 35 U.S.C. 154(b) by 149 days.

(21) Appl. No.: 15/008,977

(22) Filed: Jan. 28, 2016

(65) Prior Publication Data
US 2016/0238730 A1    Aug. 18, 2016

Related U.S. Application Data

(60) Provisional application No. 62/116,713, filed on Feb. 16, 2015.

(51) Int. Cl.
*G01V 1/38* (2006.01)

(52) U.S. Cl.
CPC .......... *G01V 1/3808* (2013.01); *G01V 1/3826* (2013.01); *G01V 1/38* (2013.01)

(58) Field of Classification Search
CPC ....... G01V 1/3808; G01V 1/38; G01V 1/3826
USPC ...................................... 367/15–20
See application file for complete search history.

(56) References Cited

U.S. PATENT DOCUMENTS

| | | | |
|---|---|---|---|
| 4,868,793 A | 9/1989 | Dunbar | |
| 6,691,038 B2 * | 2/2004 | Zajac | G01V 1/3826 367/20 |
| 7,457,193 B2 | 11/2008 | Pramik | |
| 7,658,161 B2 | 2/2010 | Toennessen et al. | |
| 7,881,153 B2 | 2/2011 | Stokkeland et al. | |
| 7,944,774 B2 | 5/2011 | Monk et al. | |
| 8,100,078 B2 | 1/2012 | Storteig et al. | |
| 8,230,801 B2 | 7/2012 | Hillesund et al. | |
| 8,320,215 B2 | 11/2012 | Toennessen | |
| 8,456,948 B2 | 6/2013 | Goujon et al. | |
| 8,570,829 B2 | 10/2013 | Hovland et al. | |

(Continued)

FOREIGN PATENT DOCUMENTS

| | | |
|---|---|---|
| GB | 2493258 | 1/2013 |
| WO | 2013041680 A2 | 3/2013 |
| WO | 2016011164 | 1/2016 |

OTHER PUBLICATIONS

GB Search Report for GB application No. GB1602459.8 dated Apr. 29, 2016.

*Primary Examiner* — Ian J Lobo

(57) ABSTRACT

Embodiments relate generally to marine geophysical surveying and, more particularly, embodiments relate to methods for acquiring geophysical data by dynamically manipulating survey spread in response a change in location of a target. A method may comprise actuating an energy source in a body of water, wherein a target for a marine geophysical survey system is located beneath a bottom of the body of water. The method may further comprise detecting energy generated by the energy source. The method may further comprise manipulating a position of a survey spread in response to a change in distribution of the target beneath the bottom of the body of water.

23 Claims, 6 Drawing Sheets

(56) References Cited

U.S. PATENT DOCUMENTS

| | | | |
|---|---|---|---|
| 8,570,830 B2 | 10/2013 | Storteig et al. | |
| 8,573,050 B2 | 11/2013 | Südow et al. | |
| 8,824,239 B2 | 9/2014 | Welker et al. | |
| 8,976,623 B2 | 3/2015 | Südow et al. | |
| 2008/0002522 A1* | 1/2008 | Berg | G01V 1/00 367/14 |
| 2008/0130411 A1* | 6/2008 | Brandsberg-Dahl | G01V 1/28 367/57 |

* cited by examiner

METHOD FOR ACQUIRING GEOPHYSICAL DATA BY DYNAMICALLY MANIPULATING SURVEY SPREAD

CROSS-REFERENCE TO RELATED APPLICATIONS

The present application claims priority to U.S. Provisional Application No. 62/116,713, filed on Feb. 16, 2015, the entire disclosure of which is incorporated herein by reference.

BACKGROUND

Embodiments relate generally to marine geophysical surveying and, more particularly, embodiments relate to methods for acquiring geophysical data by dynamically manipulating survey spread in response a change in distribution of a target.

Techniques for geophysical surveying include marine geophysical surveying, such as seismic surveying and electromagnetic surveying, in which geophysical data may be collected or acquired from below the Earth's surface. Geophysical surveying has applications in mineral and energy exploration and production to help identify locations of hydrocarbon-hearing formations. The formations of interest in the marine geophysical survey are commonly referred to as "targets."

Certain types of marine geophysical surveying, such as seismic or electromagnetic surveying, may include towing an energy source at a selected depth in a body of water. One or more streamers also may be towed in the water at selected depths by the same or a different vessel. The streamers may be cables that include a plurality of geophysical sensors disposed thereon at spaced apart locations along the length of the cable. Some geophysical surveys locate sensors on ocean bottom cables or nodes in addition to, or instead of, streamers. The geophysical sensors may be operable to generate a signal that is related to a parameter being measured by the geophysical sensor. At selected times, the energy source may be actuated to generate, for example, seismic or electromagnetic energy that travels downwardly into the subsurface rock. Energy that interacts with interfaces, generally at the boundaries between layers of formations, may be returned toward the surface and detected by the geophysical sensors on the streamers. The detected energy may be used to infer certain properties of the target, such as structure, mineral composition and fluid content, thereby providing information useful in the recovery of hydrocarbons.

Current marine geophysical survey techniques may utilize multiple streamers towed at selected lateral distances from one another. Spreading devices are commonly used in geophysical surveying to achieve the desired lateral spread between the streamers. The spreading devices may include a variety of devices, such as doors, paravanes, and steering rudders, collectively referred to herein as "deflectors." The layout of the streamers while being towed through the water is commonly referred to as the "streamer spread." The marine geophysical survey may also include other towed equipment, such as the energy source. The layout of all the in-sea equipment, including the streamer spread, the energy source(s), and the deflectors, among other equipment, may be referred to herein as the "survey spread." The survey spread, including the streamer spread, is typically determined prior to the marine geophysical survey by considering a number of factors, including without limitations, performance characteristics, financial considerations, and customer preference, among others. However, current techniques typically do not dynamically manipulate the survey spread during the marine geophysical survey to take advantage of and, thus, optimize acquired data.

BRIEF DESCRIPTION OF THE DRAWINGS

These drawings illustrate certain aspects of some of the embodiments of the present invention and should not be used to limit or define the invention.

DETAILED DESCRIPTION

Figure 1:
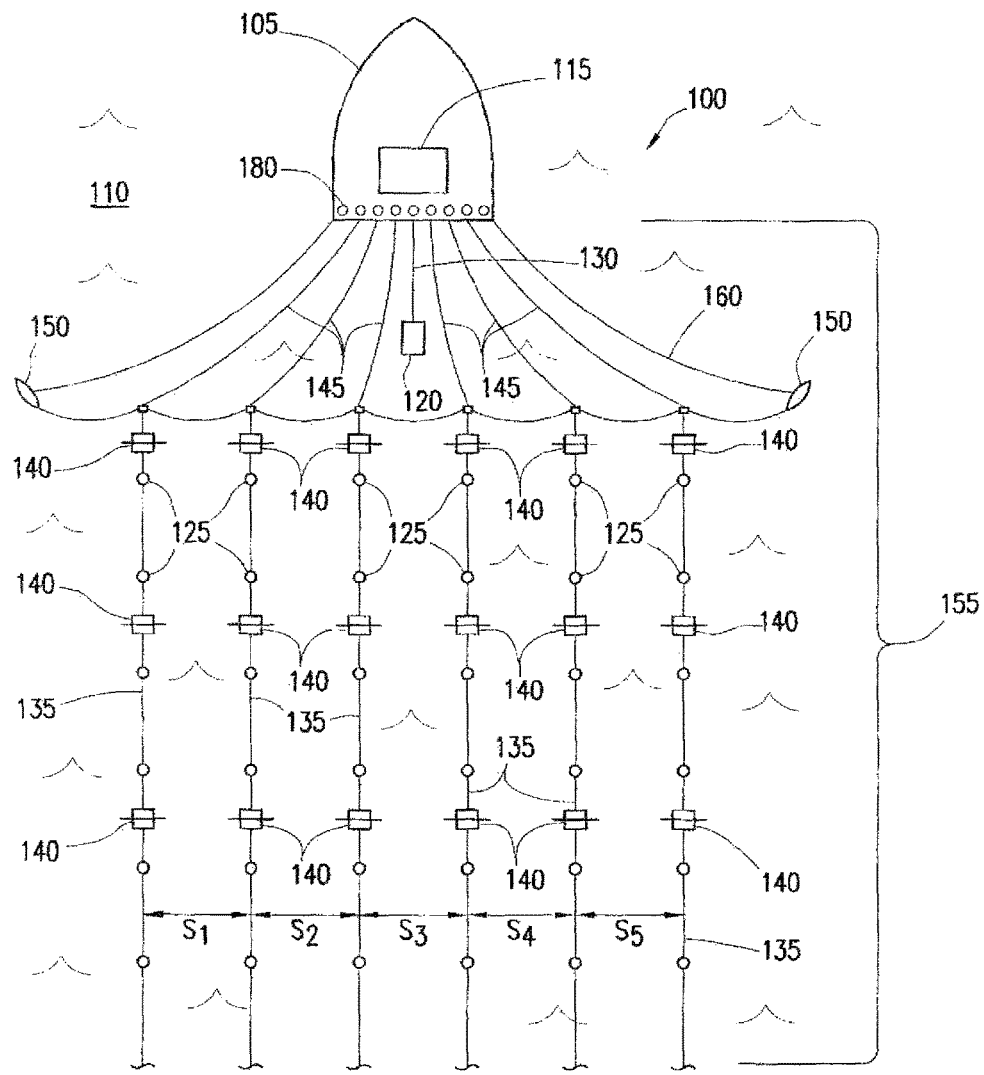
FIG. 1 illustrates an example embodiment of a marine geophysical survey system.

It is to be understood the present disclosure is not limited to particular devices or methods, which may, of course, vary. It is also to be understood that the terminology used herein is for the purpose of describing particular embodiments only and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include", and derivations thereof, mean "including, but not limited." The term "coupled" means directly or indirectly connected.

Embodiments relate generally to marine geophysical surveying. For example, the embodiments disclosed herein may have applications in marine seismic surveying, in which one or more seismic sources may be used to generate seismic energy that interacts with formations beneath a bottom of a bottom of water, and sensors—either towed or ocean bottom—may receive seismic energy generated by the seismic sources and affected by interaction with the formations. Likewise, the embodiments disclosed herein may also have applications in marine electromagnetic surveying, in which one or more electromagnetic sources may be used to generate electromagnetic fields that interact with the formations, and electromagnetic sensors—either towed or ocean bottom—may receive the electromagnetic energy affected by the interaction with the formations.

Embodiments may relate to methods for acquiring geophysical data by dynamically manipulating the survey spread in response a change in distribution of a target beneath a bottom of a body of water. By way of example, the target may not be evenly distributed in terms of depth, lateral position, thickness, and/or width such that its distribution may vary. Advantageously, by manipulating the survey spread (e.g., the streamer spread) in response to changes in distribution of the target, a clearer image of the target may be obtained. Embodiments may include dynamically manipulating the survey spread during data acquisition and/or at defined points during the marine geophysical survey. The manipulation to be performed may be determined dynamically during data acquisition or may be determined prior to data acquisition, for example, using pre-existing information about the target and then implemented during data acquisition. Embodiments of the manipulating may include changing the depth of one or more streamers, changing the lateral spacing between streamers, changing the depth of one or more energy sources, changing the lateral positioning of one or more energy sources, or any combination of these different manipulations. By way of example, changing depth/lateral positioning of one or more energy sources may include changing the depth and/or lateral positioning of one or more source subarrays, either independent or dependent upon one another. Embodiments may include changing position of the survey spread by changing position of the survey vessel.

Embodiments may include a method that may comprise actuating an energy source in a body of water, wherein a target for a marine geophysical survey system is located beneath a bottom of the body of water. The method may further comprise detecting energy generated by the energy source. The method may further comprise manipulating a position of a survey spread in response to a change in distribution of the target beneath the bottom of the body of water.

Embodiments may include a marine geophysical survey system. The marine geophysical survey system may comprise a survey spread comprising a plurality of spaced apart streamers and an energy source, wherein the streamers each comprise geophysical sensors disposed therein. The marine geophysical survey system may further comprise a data processing system operable to determine a manipulation to a position of the survey spread in response to a change in distribution of a target beneath a bottom of a body of water.

Embodiments may further include a non-transitory machine-readable medium storing instructions executable by a data processing system to cause a machine to: receive measurements of detected energy, wherein the detected energy was generated by an energy source in a marine geophysical survey; and determine a manipulation to a position of a survey spread in response to a change in distribution of a target for a marine geophysical survey system, wherein the target is located beneath a bottom of a body of water.

Referring now to FIG. 1, a marine geophysical survey system 100 is illustrated in accordance with example embodiments. As illustrated, the marine geophysical survey system 100 may include a survey vessel 105 moving along the surface of a body of water 110, such as a lake or ocean. The survey vessel 105 may include thereon equipment, shown generally at 115 and referred to for convenience as a "recording system." The recording system 115 typically may include devices (none shown separately) for navigating the survey vessel 105 (such as global positioning system ("GPS") receivers), for actuating at least one energy source 120, and/or for recording signals generated by geophysical sensors 125. Recording system 115 may include a data processing system (e.g., data processing system 500 on FIG. 5).

As illustrated, the survey vessel 105 (or a different vessel) may tow the energy source 120 in the body of water 110. During operation, the energy source 120 may be triggered at selected and/or random times. When triggered, the energy source 120 may produce energy that emanates outwardly from the energy source 120. The energy may travel downwardly through the body of water 110 and into formations (formations 160 on FIG. 2) below the bottom of the body of water 110 (bottom 165 on FIG. 2). A source cable 130 may couple the energy source 120 to the survey vessel 105. In the illustrated embodiment, the energy source 120 is towed below the surface of the body of water 110. In embodiments, the energy source 120 may be towed below the surface of the body of water 110 and above the bottom 165, wherein the energy source 120 may be disconnected from the bottom 165. For example, the energy source 120 may be towed in the body of water 110 at a depth ranging from 0 meters to about 300 meters or even greater. The energy source 120 may be any selectively actuable source suitable for marine geophysical surveying, including without limitation a seismic air gun, a water gun, a marine vibrator, an electromagnetic field transmitter, or an array of such devices. In some embodiments, seismic energy and/or electromagnetic energy may originate from the energy source 120. The energy source 120 may be towed in any suitable pattern for geophysical surveying, including in a parallel or orthogonal pattern, or possibly a circular or spiral pattern. It should be noted that, while the present example shows only a single energy source 120, the invention is applicable to any number of energy sources towed by the survey vessel 105 or any other vessel.

As illustrated in FIG. 1, the marine geophysical survey system 100 may further include streamers 135, which may be spaced apart laterally and/or vertically. "Lateral" or "laterally," in the present context, means transverse to the direction of the motion of the survey vessel 105. Geophysical sensors 125 may be disposed on the streamers 135 at spaced apart locations. The streamers 135 may each be formed, for example, by coupling a plurality of streamer segments (not shown individually) end-to-end. In one embodiment, streamers 135 may each include one or more lateral force and depth ("LFD") control devices 140. The LFD control devices 140 may be deployed, for example, to regulate streamer depth so that the streamers 135 may be kept at a selected depth profile (e.g., as level as possible) while towed through the body of water 110. The LFD control devices 140 may be any of a variety of different devices suitable for regulating streamer depth, including "birds" having variable-incidence wings. It should be noted that, while the present example, shows only six streamers 135, the invention is applicable to any number of laterally spaced apart streamers 135 towed by survey vessel 105 or any other vessel. For example, in some embodiments, 8 or more laterally spaced apart streamers 135 may be towed by survey vessel 105, while in other embodiments, up to 26 laterally spaced apart streamers 135 may be towed by survey vessel 105.

In the illustrated embodiment, the streamers 135 may be coupled to the survey vessel 105 using a one or more lead-in lines, such as lead-in lines 145. The lead-in lines 145 may be used, for example, to deploy the streamers 135 from the survey vessel 105 and to maintain the streamers 135 at a selected distance behind the survey vessel 105. As illustrated, the lead-in lines 145 may be coupled at one end to the survey vessel 105 and at the other end to the corresponding one of the streamers 135. In some embodiments, a lead-in line 145 may couple to multiple streamers 135. The lead-in lines 145 may be, for example, any of a variety of spoolable lines suitable for use in marine geophysical survey systems, including, without limitation, fiber ropes, armored cables, or any similar device or combination thereof. While FIG. 1 illustrates a particular towing configuration of streamers 135 using lead-in lines 140, it should be understood that other towing configurations that may use more or less lines and/or different arrangements thereof may be used in accordance with present embodiments.

The geophysical sensors 125 may be disposed at spaced apart locations on the streamers 135. The geophysical sensors 125 may be any type of sensor known in the art. While not shown, some geophysical surveys may locate the geophysical sensors 125 on ocean bottom cables or nodes in addition to, or instead of, the streamers 135. The geophysical sensors 125 may be any type of geophysical sensor known in the art, including seismic sensors, such as hydrophones, geophones, particle velocity sensors, particle displacement sensors, particle acceleration sensors, or pressure gradient sensors, or electromagnetic field sensors, such as electrodes or magnetometers. The geophysical sensors 125 may detect energy that originated from the energy source 120 after it has interacted with the formations. By way of example, the geophysical sensors 125 may generate signals, such as electrical or optical signals, in response to the detected energy. Signals generated by the geophysical sensors 125 may be communicated to the recording system 115. The detected energy may be used to infer certain properties of the subsurface rock, such as structure, mineral composition and fluid content, thereby providing information useful in the recovery of hydrocarbons.

In some embodiments, geophysical data obtained from one or more of the geophysical sensors 125 and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States or another country. Once onshore in, for example, the United States, geophysical analysis, including further data processing, may be performed on the geophysical data product.

As illustrated, the marine geophysical survey system 100 may further include deflectors 150. The deflectors 150 may be any type of deflector known in the art, such as doors, paravanes, steering rudders, and the like. One example of a suitable deflector 150 includes a wing-shaped body used to generate lateral force and/or thrust. Another example of a suitable deflector includes one or more foils that generate lateral force and/or thrust as towed through the body of water 110. As illustrated, the deflectors 150 may be coupled to the streamers 135. Deflectors 150 may also be coupled to the survey vessel 105, as shown in the illustrated embodiment. It should be noted that, while the present example shows only two deflectors 150, the invention is applicable to any number of deflectors 150 that may be used as desired for a particular application. In some embodiments, the deflectors 150 may be remotely controlled, for example, to control the angle of attack (or thrust) and, thus, the spread of the streamers 135.

The streamers 135, energy source 120, and deflectors 150, among other equipment, may form a survey spread 155 towed by the survey vessel 105. The survey spread 155 may include the equipment, such as the LFD control devices 140 and the like, disposed on the streamers 135 for controlling and positioning the streamers in the body of water 110. As illustrated, the streamers 135 in the survey spread 155 may have a lateral spacing, indicated by reference numbers $S_1$ to $S_5$. The lateral spacing $S_1$-$S_5$ may be consistent for all the streamers 135 or may vary. The particular configuration of the streamer 155 may be selected to optimize a number of factors including, illumination of the target 170 (e.g., shown on FIG. 2), towing efficiency, and exposure to elements, among others.

Figure 2:
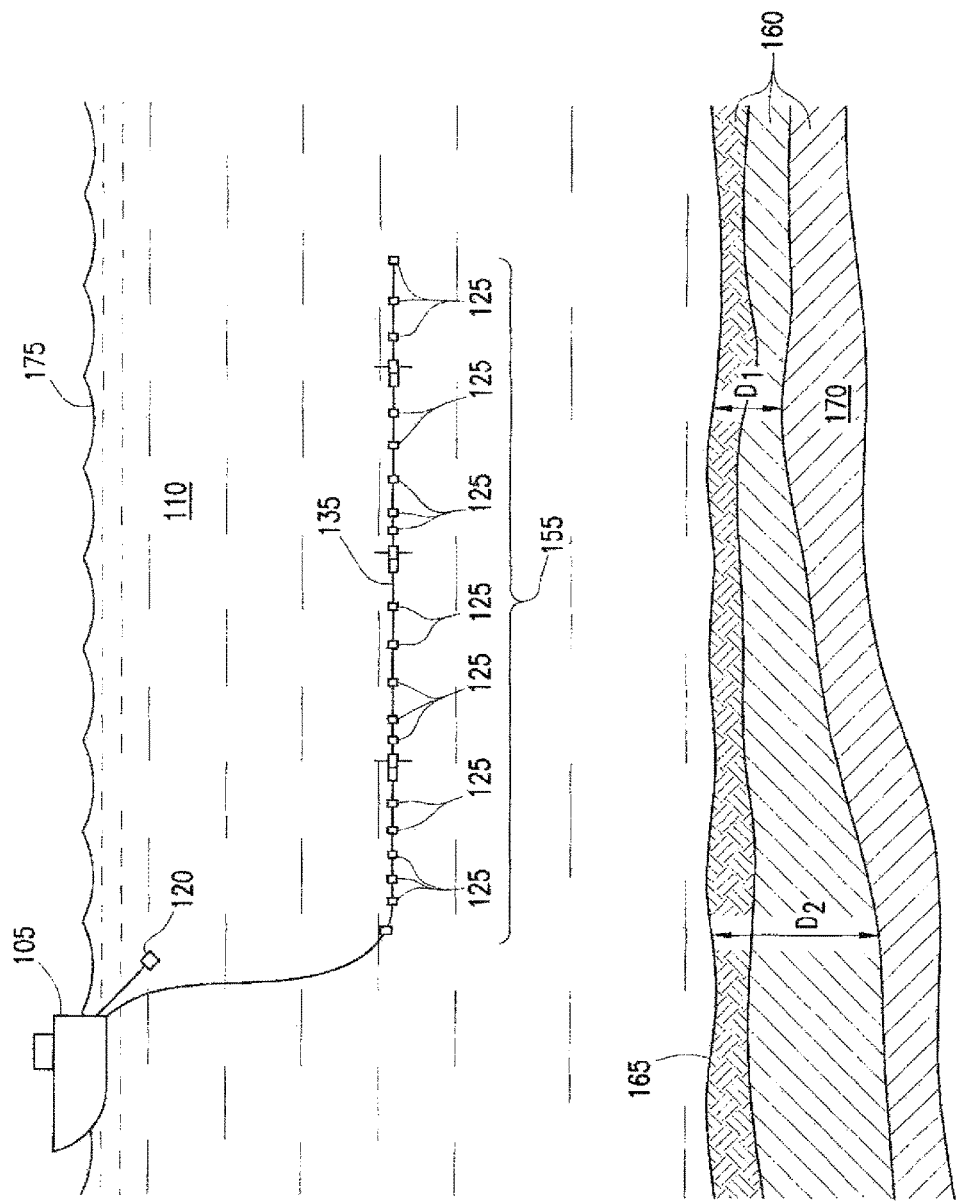
FIG. 2 illustrates a side view of the marine geophysical survey system of FIG. 1.

Referring now to FIG. 2, a side view of the survey spread 155 of FIG. 1 is illustrated in accordance with an example embodiment. As illustrated, survey vessel 105 may tow energy source 120 and streamer 135 in body of water 110. In the illustrated embodiment, streamer 135 may include a plurality of geophysical sensors 125. At selected times (or randomly) energy source 120 may be actuated to generate energy (e.g., acoustic energy or electromagnetic energy) that travels downwardly through the body of water 110 and formations 160 below bottom 165. The geophysical sensors 125 may detect energy that originated from the energy source 120 after it has interacted with the formations 160.

As illustrated, one of the formations 160 may be the target 170. Target 170 may be a particular formation or formations of interest in which it may be desired to determine certain properties. For example, it may be desired to determine the structure, mineral composition and/or fluid content of target 170, thereby providing information useful in the recovery of hydrocarbons. Target 170 may not be evenly distributed in the formations 160. By way of example, the target 170 may not be evenly distributed in terms of depth below the bottom 165. Additionally, the target 170 may also not be evenly distributed in terms of lateral position, thickness and/or width. The depth of target may be the depth of target 170 below bottom 165 and/or depth of target 170 below water surface 175. In the illustrated embodiment, the depth of target 170 may increase, for example, from $D_1$ to $D_2$, where $D_1$ is less than $D_2$.

In some embodiments, survey spread 155 may be dynamically manipulated in response to changes in distribution of target 170 beneath bottom 165. By manipulation of survey spread 155, the marine geophysical survey may be optimized. For example, a clearer image of the target 170 may be obtained if the configuration of survey spread 155 is manipulated to optimize shooting parameters. The survey spread 155 may be dynamically manipulated using any of a variety of suitable techniques. Embodiments may include dynamic manipulation of survey spread 155 during data acquisition and/or at defined points during the marine geophysical survey. By way of example, survey spread 155 may be manipulated while geophysical data is being obtained in a shot line, which may be a straight line, a curved path, or a circular path, for example. In other embodiments, the survey spread 155 may be manipulated at defined points in the marine geophysical survey. The defined points may occur with or without data acquisition. For example, the survey spread 155 may be manipulated between shot lines, for example, while the survey vessel 105 is transitioning from shot line to another shot line.

In some embodiments, dynamically manipulating survey spread 155 may include one or more of changing the positioning of streamers 135 and/or energy source 120. The survey spread 155 may be manipulated in response to changes in distribution of target 170, such as changes in depth, lateral position, and/or width of target 170. Streamers 135 and energy source 120 may be separately manipulated to effect a change in position of either streamers 135 or energy source 120 or both may be manipulated to effect a change in position of both streamers 135 and energy source 120. Embodiments may include dynamically manipulating survey spread 155 in response to a change in distribution of target 170 that exceeds a certain preset value. These changes in distribution may be actual changes, for example, in the depth, lateral position, and/or width of a first portion of target 170 with respect to a second portion of target 170 that may occur as survey spread 135 may be towed over target 170. In some embodiments, survey spread 155 may be manipulated to effect a change in position of survey spread 155 if the change in depth and/or lateral position of target 170 exceeds of a preset value of about 5%, about 10%, about 50%, about 100%, or even more. For example, if the position of target 170 (e.g., depth, lateral spacing, etc.) changes by more than the preset value, the position of streamer 135 and/or energy source 120 may be changed, for example, to optimize data acquisition. In some embodiments, an acoustic system (not shown) may be used to determine position of the streamer 135 and energy source 120.

Embodiments of manipulating survey spread 155 may include changing the depth of at least one of the streamers 135 and/or changing the lateral position of at least one of the streamers 135. By way of example, survey spread 155 may be manipulated to have a greater lateral spacing $S_1$ to $S_5$ between streamers 135. Accordingly, should the depth of target 170 increase during the marine geophysical survey, lateral spacing lateral spacing $S_1$ to $S_5$ between streamers 135 between one, more than one, or all of streamers 135 may be changed (e.g., increased or decreased). In addition, the depth of one or more of streamers 135 may also be changed (e.g., increased or decreased) should the depth of target 170 increase during the marine geophysical survey. In general, a greater depth of streamers 135 may allow recovery of lower frequencies. Conversely, should the depth of target 170 decrease during the marine geophysical survey, lateral spacing $S_1$ to $S_5$ between streamers 135 between one, more than one, or all of streamers 135 may be changed (e.g., increased or decreased). In addition, depth of one or more streamers 135 may also be changed (e.g., increased or decreased) should the depth of target 170 decrease. The change in depth of one or more of streamers 135 may occur in conjunction with a decrease in lateral spacing $S_1$ to $S_5$ or may be done independently of changing lateral spacing S to $S_5$. The depth of the streamers 135 may be changed, for example, to increase and/or decrease a vertical distance between the streamer 135 and target 170.

Embodiments of manipulating survey spread 155 may include changing the depth of at least one energy source 120 and/or changing lateral positioning of at least one energy source 120. As will be discussed in more detail below with respect to FIG. 4, energy source 120 may be a component of a source array (e.g., source array 400 on FIG. 4), which may be comprised of a number of source subarrays (e.g., source subarrays 405 on FIG. 4). Manipulation of the at least energy source in a source array or source subarray will be described in more detail below with respect to FIG. 4. Turning back to FIGS. 1 and 2, survey spread 155 may be dynamically manipulated to increase and/or decrease the depth of at least one energy source 120. This depth change may be in response to a change in distribution of target 170. By way of example, a shallower energy source 120 may be desired should target 170 also be shallow. Accordingly, survey spread 155 may be manipulated to decrease depth of at least energy source 120 in response to the distribution of target 170 decreasing in depth. In some embodiments, energy source 120 that is shallow may be desired should target 170 be shallow, for example, to better recover higher frequencies. Conversely, survey spread 155 may be manipulated to increase depth of at least one energy source 120 in response to the distribution of target 170 increasing in depth. Additionally, embodiments may include changing the position of energy source 120 in response to changes in overburden of target 170. By way of example, if the overburden of target 170 increases, then depth of energy source 120 may be increased, for example, due to a lower frequency output. As will be appreciated by those of ordinary skill in the art, the higher frequencies (Q Value) may be attenuated with increased overburden necessitating the at least one source 120 to be deeper due to the lower frequency output, in some embodiments. Conversely, if the overburden of target decreases, then depth of energy source 120 may be decreased, in some embodiments.

Any of a variety of suitable techniques may be used to manipulate survey spread 155. A control system (not shown) may be included, for example, on survey vessel 105. In some embodiments, the control system may be a part of recording system 115. The control system may receive inputs, including target 170 position and configuration of survey spread 155, as well as environmental input such as wind, current, velocity, waves, density, and the like. In some embodiments, the control system may predict a future configuration of survey spread 155 based on these environmental inputs, for example. The control system may also determine a new configuration of survey spread 155 in response to changes in distribution of target 170. By way of example, the control system may determine a new position of streamers 135 and/or energy source 120 in response to changes in location of target 170. These new positions may then be sent to an in-sea control system that can manipulate position of the streamers 135 and/or energy source 120. The in-sea control system may include winches 180, LFD control devices 140, and/or deflectors 150, among other equipment. In some embodiments, winches 180 may be used, for example, to control depth of streamers 135 and/or energy source 120. While illustrated on FIG. 1 on survey vessel 105, one or more winches 180 may alternatively be disposed on a float(s) that may be associated with streamers 135 and/or energy source 120. In some embodiments, LFD control devices 140 may be used to manipulate depth and/or lateral position of streamers 135. Deflectors 150 may be also be controlled to manipulate depth and/or lateral position of streamers 135. By way of example, deflectors 150 that are steerable may be used in some embodiments.

In some embodiments, the distribution of target 170 may be determined. The distribution of target 170 may be monitored during the marine geophysical survey. For example, the distribution of target 170 may be dynamically determined during data acquisition. Alternatively, the distribution of target 170 may be determined prior to the marine geophysical survey, for example, using a prior understanding of subsurface geology and target 170. In some embodiments, pre-existing two-dimensional or three-dimensional seismic data may be analyzed to determine changes in distribution of target 170.

Figure 3:
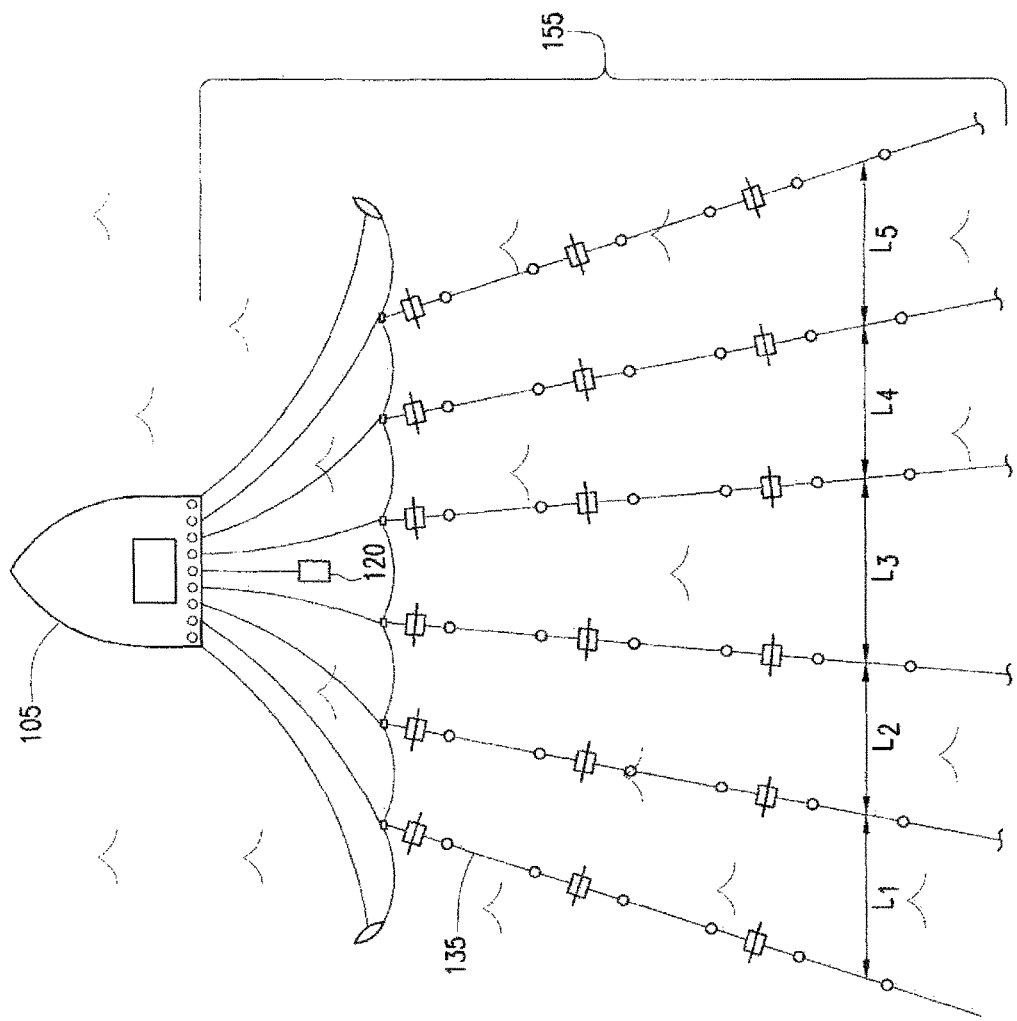
FIG. 3 illustrates an example of an alternative embodiment of a marine geophysical survey system with streamers arranged in a fan configuration.

Referring now to FIG. 3, an alternative embodiment of survey spread 155 is illustrated. In the illustrated embodiment, streamers 135 may be arranged behind survey vessel 105 in a fan configuration in which lateral spacing $S_1$ to $S_5$ between streamers 135 may increase with increasing distance from survey vessel 105 and energy source 120. As used herein, the rate at which lateral spacing $S_1$ to $S_5$ changes may be referred to as the "amount of fanning." In some embodiments, the amount of fanning may be determined based on distribution of target 170 (e.g. shown on FIG. 2). By way of example, the amount of fanning may be increased with increasing depth of target 170. By way further example, the amount of fanning may be decreased with decreasing depth of target 170.

Figure 4:
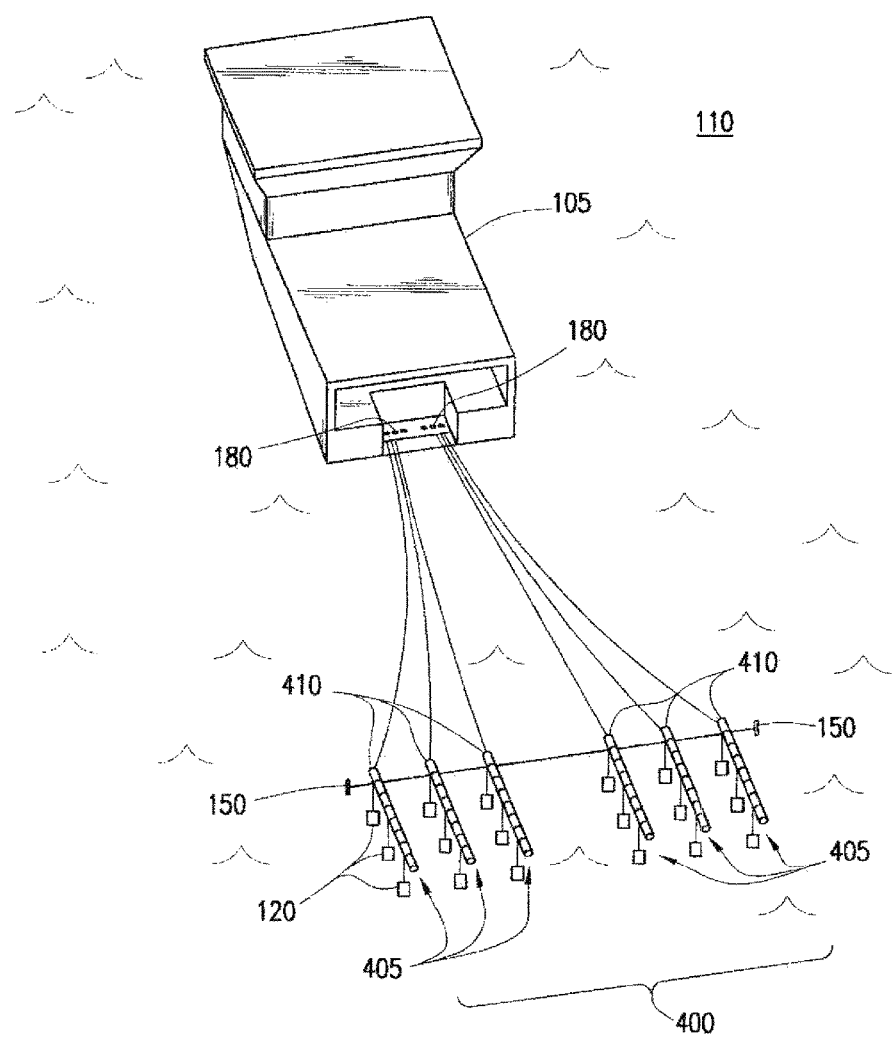
FIG. 4 illustrates an example embodiment of a source array.

FIG. 4 illustrates survey vessel 105 towing source array 400. For simplicity, the other components of survey spread 155 (e.g., streamers 135) are not shown on FIG. 4. As illustrated, survey vessel 105 may tow source array 400 in body of water 110. In the illustrated embodiments, source array 400 may comprise source subarrays 405. As illustrated, there may be six source subarrays 405 in source array 400. However, while present embodiments illustrate six subarrays 405, it should be understood that embodiments can include more or less than six subarrays 405. As illustrated, the source subarrays 405 may comprise energy sources 120. In the illustrated embodiment, each source subarray 405 includes three energy sources 120. However, source subarrays 405 with more or less than three energy sources 120 may be used in accordance with present embodiments. It should be understood that the energy sources 120 in each source subarray 405 may be operated conjunctively. Each of the source subarrays 405 may further comprise a float 410. Energy sources 120 may suspended in the body water 110 from floats 410. A wide variety of floats 410 may be utilized in accordance with embodiments of the present invention. In some embodiments, floats 410 may include a structure that comprises a buoyant material, such as foams and gels, among others. In some embodiments, the subarrays 405 may be spaced at a lateral spacing of about 2 meters to about 30 meters. However, spacing outside these ranges may be used in present embodiments. In some embodiments, the energy sources 120 may be suspended form the floats 410 at a depth of from about 1 meter to about 75 meters or even greater. However, alternative configurations of source array 400 may be used, including without limitations a source array 400 that does not include floats 410.

As previously described, embodiments may include changing the depth of at least one energy source 120. By way of example, the position of energy sources 120 in source array 400 may be changed in response to a change in distribution of target 170 (e.g., shown on FIGS. 1 and 2). The lateral spacing and depth of energy sources 120 in the source subarrays 405 may be changed independently from one another or dependent on one another. In some embodiments, the position (e.g., depth) of all the energy sources 120 in source array 400 may be globally changed, for example, the same amount. In alternative embodiments, the position of energy sources 120 in one of the source subarrays 405 or a subset of the source subarrays 405 may be changed independent of the other energy sources 120. Any suitable technique may be used for changing depth and/or lateral spacing of energy sources 120 in source array 400. In some embodiments, winches (not shown) may be incorporated into floats 410 to change depth of energy sources 120. Source array 400 may further include deflectors 150 which may be used, in some embodiments, to manipulate lateral position and/or depth of the source subarrays 405.

Figure 5:
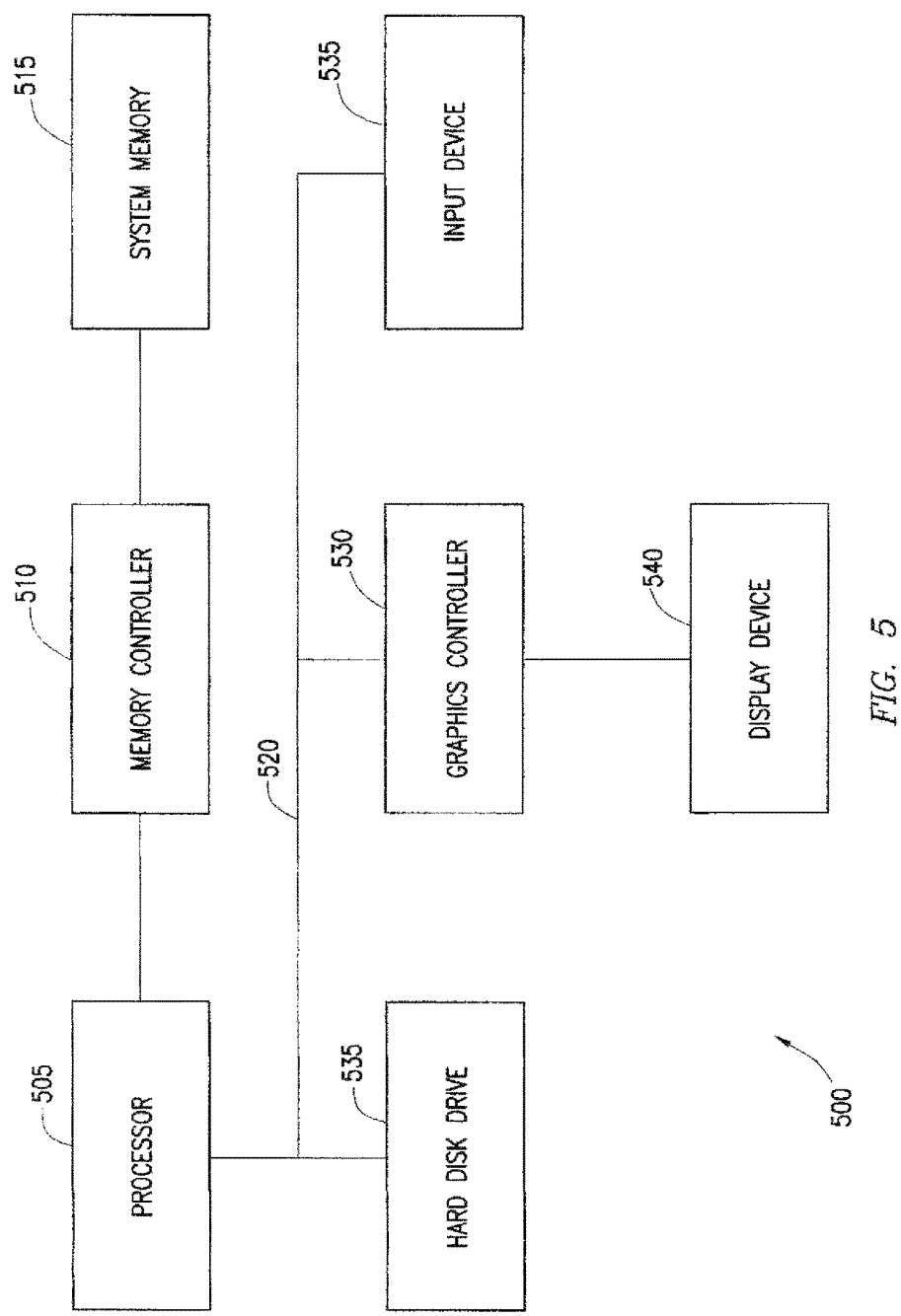
FIG. 5 illustrates an example embodiment of a data processing system.

FIG. 5 illustrates one embodiment of a data processing system 500 that may be utilized in accordance with embodiments of the present invention. In some embodiments, the data processing system 500 may be a component of the recording system 115 (e.g., FIG. 1). In alternative embodiments, the data processing system 500 may be separate from the recording system 115. The data processing system 500 may be used for implementing embodiments of the techniques for manipulating the configuration of survey spread 155 (e.g., FIG. 1). It should be understood that the data processing system 500 does not necessarily have to be located on the survey vessel 105. Special or unique software for receiving the inputs, data processing, and sending output signals may be stored in the data processing system 500 and/or on external computer readable media. Those of ordinary skill in the art will appreciate that the data processing system 500 may comprise hardware elements including circuitry, software elements including computer code stored on a non-transitory machine-readable medium or a combination of both hardware and software elements. Additionally, the blocks shown on FIG. 5 are but one example of blocks that may be implemented. A processor 505, such as a central processing unit or CPU, may control the overall operation of the data processing system 500. The processor 505 may be connected to a memory controller 510, which may read data to and write data from a system memory 515. The memory controller 510 may have memory that includes a non-volatile memory region and a volatile memory region. The system memory 515 may be composed of a plurality of memory modules, as will be appreciated by one of ordinary skill in the art. In addition, the system memory 515 may include non-volatile and volatile portions. A system basic input-output system (BIOS) may be stored in a non-volatile portion of the system memory 515. The system may be adapted to control a start-up or boot process and to control the low-level operation of the data processing system 500.

The processor 505 may be connected to at least one system bus 520 to allow communication between the processor 505 and other system devices. The system bus 520 may operate under a standard protocol such as a variation of the Peripheral Component Interconnect (PCI) bus or the like. In the example embodiment shown in FIG. 5, the system bus 520 may connect the processor 505 to a hard disk drive 525, a graphics controller 530 and at least one input device 535. The hard disk drive 525 may provide non-volatile storage to data that may be used by the data processing system 500. The graphics controller 530 may be in turn connected to a display device 540, which may provide an image to a user based on activities performed by the data processing system 500. The memory devices of the data processing system 500, including the system memory 515 and the hard disk drive 525 may be tangible, machine-readable media that store computer-readable instructions to cause the processor 500 to perform a method according to an embodiment of the present techniques.

Figure 6:
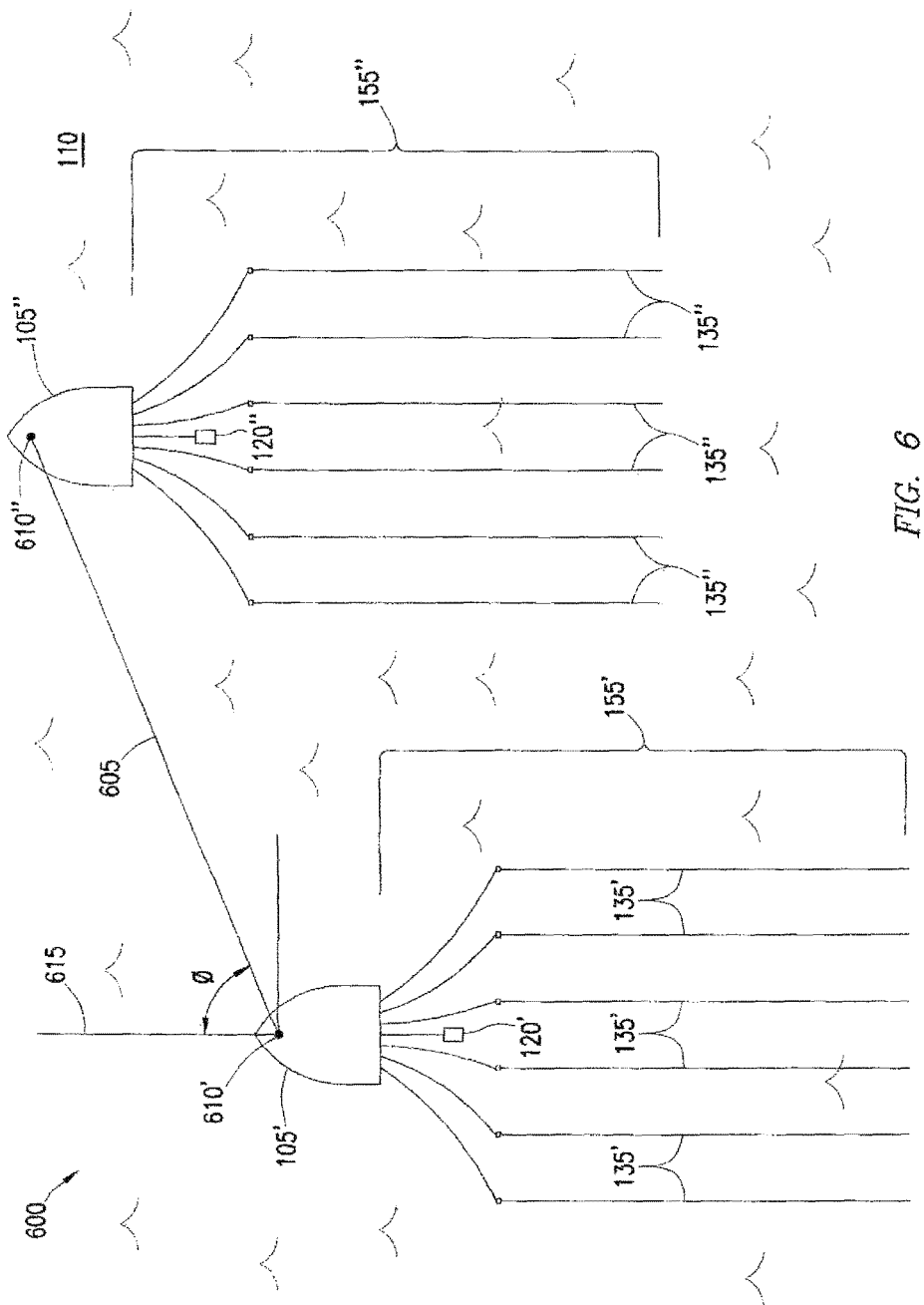
FIG. 6 illustrates an example embodiment of a multi-vessel marine geophysical survey system.

With reference now to FIG. 6, a multi-vessel marine geophysical survey system 600 is illustrated in accordance with example embodiments. In the illustrated embodiment, multi-vessel marine geophysical survey system 600, in which survey vessels 105', 105" are moving along the surface of body of water 110. As illustrated, the survey vessels 105', 105" may be towing respective survey spreads 155', 155", which may comprise energy sources 120', 120", and streamers 135', 135". FIG. 6 illustrates both survey spreads 155', 155" as comprising energy sources 120', 120" and streamers 135', 135", it should be understood any combination of energy sources 120', 120" and streamers 135', 135" may be contained in survey spreads 155', 155". For example, survey spread 155' may contain both seismic source 120' and streamers 135' while survey spread 155" only contains seismic source 120" or streamers 135".

The previously described embodiments for dynamically manipulating survey spreads (e.g., survey spreads 155', 155") in response a change in distribution of a target beneath a bottom of a body of water may be used in conjunction with multi-vessel marine geophysical survey system 600. By way of example, embodiments may include changing the depth of one or more streamers 135', 135", changing the lateral spacing between streamers 135', 135", changing the depth of one or more energy sources 120', 120", changing the lateral positioning of one or more energy sources 120', 120", or any combination of these different manipulations. By way of example, changing depth/lateral positioning of one or more energy sources 120', 120" may include changing the depth and/or lateral positioning of one or more source subarrays (e.g., source subarrays 405 on FIG. 4), either independent or dependent upon one another. Embodiments may include changing position of the survey spreads 155', 155" by changing position of the corresponding survey vessel 105, 105". In addition, the relative positioning of the survey vessels 105', 105" may also be changed in response a change in distribution of a target beneath a bottom of a body of water. As illustrated on FIG. 6, the radial length between survey vessels 105', 105" is shown as reference number 605. The radial length 605 may be the distance between corresponding reference point (illustrated on FIG. 6 as reference points 610', 610") on each of the survey vessels 105', 105". An angle θ may be defined between a survey path 615 of one of the survey vessels (e.g., survey vessel 105' on FIG. 6) and the radial length 605. Accordingly, changing the relative positioning of the survey vessels 105', 105" may include changing one or more of the radial length 605 and/or the angle θ. It should be understood that, while FIG. 6 illustrates two survey vessels 105', 105", embodiments may include changing relative positioning of more than two survey vessels 105', 105" in response a change in distribution of a target beneath a bottom of body of water.

If there is a conflict in the usages of a word or term in this specification and or more patent or other documents that may be incorporated herein by reference, the definitions that are consistent with this specification should be adopted for the purposes of understanding this invention.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed:

1. A method comprising:
   actuating an energy source in a body of water, wherein a target for a marine geophysical survey system is located beneath a bottom of the body of water;
   detecting energy generated by the energy source;
   monitoring a distribution of the target during detection of the energy; and
   manipulating a position of a survey spread in response to a change in distribution of the target beneath the bottom of the body of water during detection of the energy.

2. The method of claim 1, wherein the survey spread comprises a plurality of spaced apart streamers and an energy source, wherein the streamers each comprise geophysical sensors disposed therein.

3. The method of claim 2, wherein the step of manipulating the position of the survey spread comprises changing a position of the energy source in response to the change in distribution of the target, and changing a position of at least one of the streamers in response to the change in distribution of the target.

4. The method of claim 3, further comprising towing one or more deflectors in the body of water, and manipulating the deflectors to change the lateral position and/or depth of the one or more of the streamers.

5. The method of claim 1, wherein the step of manipulating the position of the survey spread comprises changing depth and/or lateral spacing of streamers in the survey spread.

6. The method of claim 1, wherein the position of the survey spread is manipulated in response to a change in the distribution of the depth of the target beneath the bottom of the body of water.

7. The method of claim 1, wherein the survey spread comprises streamers arranged in a fan configuration, and wherein the step of manipulating the position of the survey spread comprising changing the amount of fanning.

8. The method of claim 1, further comprising changing relative positioning between two or more survey vessels in response to the change in distribution of the target beneath the bottom of the body of water.

9. The method of claim 1, further comprising producing a geophysical data product from the detected energy and storing the geophysical data product on a non-transitory machine-readable medium suitable for importing onshore.

10. The method of claim 1, wherein the change in distribution of the target is an actual change in depth, lateral position, and/or width of a first portion of the target with respect to a second portion of the target.

11. A marine geophysical survey system comprising:
    a survey spread comprising a plurality of spaced apart streamers and an energy source, wherein the streamers each comprise geophysical sensors disposed therein; and
    a data processing system operable to:
      monitor a distribution of a target during data acquisition; and
      determine a manipulation of a position of the survey spread in response to a change in distribution of the target beneath a bottom of a body of water during the data acquisition.

12. The marine geophysical survey system of claim 11, wherein the manipulation of the position of the survey spread comprises a change to a position of the energy source, and a change to a position of at least one of the streamers.

13. The marine geophysical survey system of claim 11, wherein the survey spread further comprises one or more deflectors coupled to the streamers, wherein the deflectors are operable to change the lateral position and/or depth of the streamers.

14. The marine geophysical survey system of claim 11, wherein the manipulation of the position of the survey spread comprises a change to depth and/or lateral spacing of the streamers in the survey spread.

15. The marine geophysical survey system of claim 11, wherein the manipulation of the position of the survey spread is in response to a change in the distribution of the depth of the target beneath the bottom of the body of water.

16. The marine geophysical survey system of claim 11, wherein the streamers are arranged in a fan configuration, and wherein the manipulation of the position of the survey spread is in response a change to the amount of fanning of the streamers.

17. The marine geophysical survey system of claim 11, wherein the data processing system is further operable to determine the change in distribution of the target.

18. A non-transitory machine-readable medium storing instructions executable by a data processing system to cause a machine to:
receive measurements of detected energy, wherein the detected energy was generated by an energy source in a marine geophysical survey;
monitor a distribution of a target during data acquisition; and
determine a manipulation of a position of a survey spread in response to a change in distribution of the target for a marine geophysical survey system during the data acquisition, wherein the target is located beneath a bottom of a body of water.

19. The non-transitory machine-readable medium of claim 18 further comprising instructions executable by the data processing system to cause the machine to determine the change in distribution of the target.

20. A method comprising:
actuating a seismic source in a body of water;
detecting seismic energy generated by the seismic source after the seismic energy has interacted with a target for a marine geophysical survey system located beneath a bottom of the body of water;
monitoring depth of the target during detection of the energy; and
changing a position of at least one survey spread in response to a change in the depth of the target beneath the bottom of the body of water during the detection of the energy, wherein the survey spread comprises a plurality of spaced apart streamers and an energy source, wherein the streamers each comprise seismic sensors disposed therein, wherein at least one of the seismic sensor detects the seismic energy, wherein the changing the position comprises changing a depth of at least one of the plurality of streamer and changing lateral positioning between two or more of the plurality of spaced apart streamers.

21. The method of claim 20, wherein the step of changing the position further comprises changing depth of one or more subarrays of the seismic source and lateral positioning between two or more of the subarrays.

22. The method of claim 20, wherein the seismic source comprises a plurality of subarrays of seismic sources, wherein the changing the position comprises changing lateral depth and positioning of one or more of the seismic sources in a particular one of the subarrays independent of other seismic sources in the particular one of the subarrays.

23. The method of claim 20, wherein the plurality of streamers are towed in a fan configuration in which lateral spacing between the streamers increases with increasing distances from a survey vessel towing the streamers, and wherein the step of changing the position further comprising increasing or decreasing an amount of fanning in response changing depth of the target.

\* \* \* \* \*